United States Patent Office 3,671,296
Patented June 20, 1972

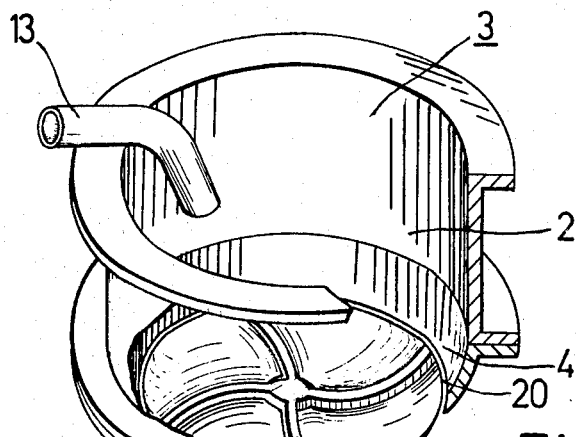
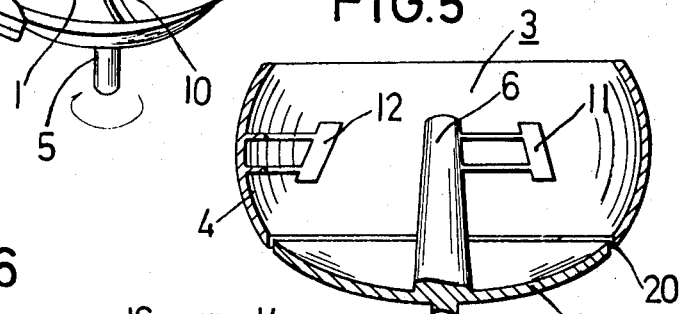
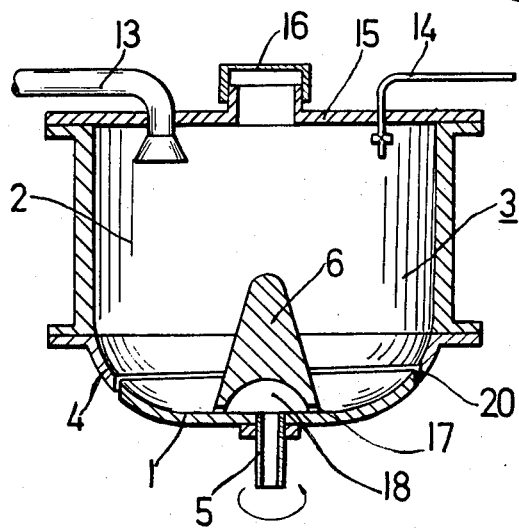

3,671,296
PROCESS FOR COATING GRANULAR MATERIALS
Yoshiro Funakoshi, Kyoto-shi, Takehiko Kajiura, Toyonaka-shi, Kiyoshi Fujii, Osaka-fu, Toshihiko Kanamaru, Kyoto-fu, Masaki Nishitani, Osaka-fu, and Hiromu Komeda, Gose-shi, Japan, assignors to Takeda Chemical Industries, Ltd.
Filed July 28, 1969, Ser. No. 845,296
Int. Cl. B05c 3/04, 3/08
U.S. Cl. 117—100 B
3 Claims

ABSTRACT OF THE DISCLOSURE

This invention relates to a process for coating granular materials, including tablets and pills, and an apparatus for treating the surfaces of granules with coating materials, including liquid and powder, and/or dry air. The apparatus of the invention comprises a dish mounted rotatably at its center and a stationary barrel having a smoothly curved inner-surface which continues upwards from the periphery of the dish. The granules to be coated are continuously circulated in a receptacle integral with the dish and the barrel by rotating the dish. Such circulation of the granules provides excellent fluidity and abrasion between granules that coating materials and/or dry air spread uniformly over and contact all granule surfaces in a short time.

---

The present invention relates to a process for coating granular materials, including tablets and pills, and apparatus therefor: particularly an apparatus applicable to various steps for treating the surface of such granular materials with coating materials, including liquid, powder, and/or dry air.

As a sugar coating process, for instance, there has been known hitherto a process which comprises applying an aqueous solution of sugar onto tablets or pills in the fluidized state in a rotating coating pan (or a column constituting a fluidized bed), and subsequently or simultaneously drying with hot air. When using a conventional coating pan, the efficiency of treatment of the tablets in relation to the volume of the pan is not always satisfactory, and the average contact area of each tablet rotating in the pan with dry air is so small that a relatively long time is required for drying with hot air. When using the column, the efficiency of treatment of the tablets may be improved somewhat, but if the coating materials are viscous a stable fluidizing state in the column can be maintained only with great difficulty.

A main object of the present invention is to provide a novel process and apparatus for coating granular materials which overcomes the above-mentioned disadvantages.

In theory, the process conditions for producing good coated granules are as follows:

(1) The surfaces of the granular materials are not scratched;
(2) The coating materials are uniformly and evenly spread on the surfaces of the granular materials;
(3) The solvent for the coating materials penetrates as little as possible into the granular materials;
(4) The granular materials are gently rubbed and polished in the drying process; and
(5) The drying process is finished in a short time.

To satisfy condition (1), it is necessary to minimize any local force added to the granular materials as much as possible. To satisfy condition (2), it is necessary to carry out effectively mutual rubbing of the granules. To satisfy condition (3), it is necessary to mix and circulate the granular materials sufficiently and rapidly. To satisfy condition (4), it is necessary to effectively achieve rubbing between the granular materials and the wall of the apparatus, as well as mutual rubbing of the granules. To satisfy condition (5), it is necessary to have a large contact area of the granular materials with dry, preferably warm air.

All of the above-mentioned conditions can be satisfied by the process and apparatus of the present invention, even though it is difficult (if not impossible) to satisfy these conditions by any conventional coating process or apparatus.

It is another object of this invention to provide a process and apparatus for uniformly and efficiently treating the surface of granular materials with coating materials and/or dry air in a short time.

It is a further object of the invention to provide a process and apparatus widely applicable to the surface treatment of artificial or natural granules such as medicinal tablets or pills, small grains of wood, balls of metal, granules of china, porcelain, rubber, plastics and the like.

It is a particular object of the invention to provide an apparatus for coating the surface of such granules that is simple, compact, durable, novel in design, and capable of performing its intended functions in an entirely satisfactory and trouble-free manner.

The foregoing objects are accomplished by using an apparatus which comprises a rotating dish mounted rotatably at its center and a stationary barrel surrounding the dish, the latter having a smoothly curved inner-surface continued upwards from the periphery of the dish to cause the granules to circulate smoothly.

By rotating the dish, centrifugal force is applied to the granules, and the upward curve of the barrel directs the granules upwards to the upper portion of the barrel. As a result, each granule circulates from the center portion of the dish to the upper portion of the barrel and then drops downward from the periphery of the barrel to the center of the dish so as to contact uniformly the coating materials and/or dry air.

Such circulating flow of the granules provides such excellent fluidity of the granules, as well as abrasion between granules, that the coating materials and/or dry air blown into the receptacle uniformly contact the surfaces of all granules in a short time. Moreover, by means of a conical projection on the center of the dish, the circulating flow downward from the periphery of the barrel to the center of the dish is accelerated smoothly and effectively. Furthermore, the circulating flow may also be accelerated by at least one substantially helical concave or convex ridge on the conical projection and/or the barrel. The ridge on the barrel should tend to lift the granules as the dish is rotated, while that on the projection should tend to carry the granules down. Thus the granules are mixed efficiently to create uniform mutual contact by striking against each other and the wall of the receptacle.

Means for feeding dry air into the receptacle are provided. This can be done advantageously by having ventilation means such as vent-holes arranged in the dish or barrel, and a ventilation gap between the dish and the barrel. In addition, means for feeding the coating materials including appropriate piping are also provided. As a result, air and coating materials are supplied to effectively coat and dry the granules.

In the process of this invention, the granular materials to be coated are charged into the receptacle first and the dish is rotated to circulate the granules. Then, the coating materials are added to the circulating granules. After the coating materials are uniformly spread on the surface of the granules, dry air is blown into the receptacle to dry the coated granules during continued rotation of the dish. If desired, a dusting powder for thickening the layer of coating materials or for adding other kinds of the coating materials sprayed onto the circulating granules to accelerate the coating. In this manner, the coated granules are produced in the receptacle.

The apparatus of the invention has a number of advantages including:

(1) The speed of coating and drying of the materials is increased because the fluidizing velocity of the granules can be varied over a wide range by the rotating dish. As a result, granular materials of lower water content may be obtained.

(2) As the granules are uniformly mixed with each other by the circulating flow in the receptacle, the rubbing and impact strength of the coated granules, especially at the edge of the coating layer, is greater than when using the conventional coating pan.

(3) The volume efficiency of the granules against the receptacle increases more than about 2 times in comparison with that of a conventional coating pan having the same diameter.

(4) Unevenly coated granules are extremely few, because the circulating flow is carried out in substantially symmetrical manner at the vertical axis of the receptacle and the spreading velocity of the coating materials is very high.

(5) The drying efficiency of the granules is increased, because the dry air flows smoothly through the granules in the receptacle.

(6) Granules coated with multiple layers can be easily obtained in the continuous process by using multistage receptacles which can easily be arranged with a plurality of receptacles vertically of one another.

These and other objects and aspects of the invention will be more clearly understood from the following description and the accompanying drawings of the embodiments of the invention.

In the drawings constituting a part hereof, and wherein like reference numerals denote corresponding parts:

FIG. 4 shows schematically a broken-sectional view of a coating apparatus provided with anti-skid projections on the rotating dish, and constitutes a fourth embodiment of the invention;

FIG. 5 is a sectional view similar to FIG. 1 of a fifth embodiment of the invention; and FIG. 6 is a sectional view similar to FIG. 1 of a sixth embodiment of the invention.

Figure 1:
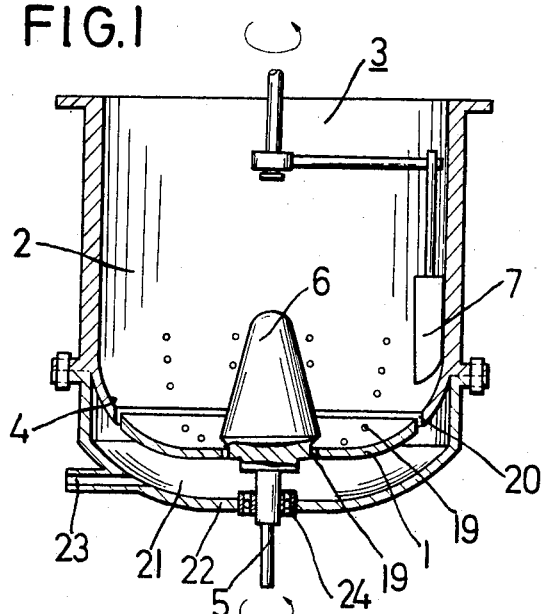
FIG. 1 is a sectional view of a coating apparatus provided with a conical projection at the center of the rotating dish constituting the first embodiment of the invention.

A coating apparatus according to the invention comprises rotating dish 1 mounted rotatably at its center and stationary barrel 2 surrounding dish 1, both constituting receptacle 3 into which the granular materials to be coated are charged.

Barrel 2 has a smoothly curved inner surface 4 continuing upwards from the periphery of dish 1 to cause the granules deposited thereon to circulate smoothly.

Preferably, rotating dish 1 is supported on an approximately vertical axis of rotation. For best results, the axis should not deviate from the vertical by more than 5° in any direction. It has also been found advantageous to provide conical projection 6 at the center of dish 1 as shown in FIGS. 1, 2, 3, 5 and 6. The angle of inclination of the slope of projection 6 is preferably in a range of 45°–80° to the horizontal and the diameter of the bottom part of the conical projection is preferably determined so that the acceleration caused by the centrifugal force on the circumference thereof is 0.7–2 times the acceleration of gravity.

Figure 2:
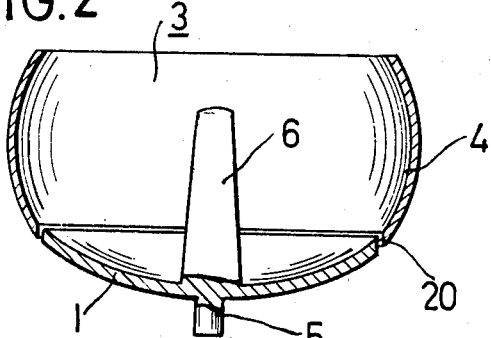
FIG. 2 is a sectional view similar to FIG. 1 of a second embodiment of the invention.

The optimum velocity of rotation of dish 1 may vary with the size of the apparatus and the kind and size of the granules to be coated. The inner-surface of barrel 2 may be formed with a combination of a curved wall and a cylindrical wall as shown in FIG. 1, or may be formed with an entirely curved wall as shown in FIG. 2. In order that the granules may circulate more smoothly, the inner-surface of barrel 2 may be made slippery by providing smooth resin coating such as Teflon (manufactured by E. I. du Pont) especially at the upper part when the coating materials have low viscosity.

The apparatus is preferably provided with a rotating stirrer 7 for the purpose of maintaining smooth movement of the granules near the cylindrical wall of the barrel as shown in FIG. 1. It is also preferably provided with a helical convex or concave ridge 8, ascending in the direction of rotation of dish 1, on the inner-surface of barrel 2 to circulate the granules near barrel 2 smoothly.

The angle of the ascent of ridges 8 may be varied according to the characteristics of the granules but is preferably in a range of 5°–70° to the horizontal. If the angle is too steep, the centrifugal movement of the granules is obstructed; and if the angle is too shallow, the upward movement of the granules is reduced. The velocity of ascent of the granules is $v \tan \theta$ in which $v$ is the velocity of the granules at the circumference of dish 1 near barrel 2, and $\theta$ is the angle of ascent of ridges 8 and 8a. In the above formula the optimum $\theta$ may be selected as a practical ascent angle of ridge 8, because $\theta$ increases in proportion to $\tan \theta$ and in inverse proportion to $v$.

As an alternative or supplement to ridge 8, there may be provided intermittent screw 8a which is more effective for the combination of upward and circular movement of the granules.

Also, conical projection 6 is preferably provided with a screw convex 9 ascending in the direction opposite to that of rotation of dish 1. Thus, the granules are pushed downwards to the base of screw convex 9 which rotates together with dish 1 to circulate the granules smoothly at the center portion of the receptacle. The angle of ascent of screw 9 is varied according to the characteristics of the granules, but is preferably in the range of 10°–80° to the horizontal. If the angle is too steep, the movement of the granules is obstructed, and if the angle is too shallow, the downward force of the screw is reduced.

Anti-skid projections 10 (see FIG. 4) having a curve in the direction of rotation of dish 1 are preferably provided on the surface of dish 1 to promote the circulation of granules on the dish.

If the receptacle is large, the circulating movement of the granules becomes slow in the area remote from both dish 1 and barrel 2. Therefore, it is preferable to provide a rotating agitator 11 on conical projection 6 and a stationary agitator 12 on barrel 2 to further promote the circulation of the granules in the receptacle.

In addition, means for feeding dry air and the coating materials into receptacle 3 are provided. These may be in the form of piping and/or ventholes including a spray nozzle. The simplest manner is to feed the dry air and/or coating materials into the upper opening of the receptacle onto the granules from a pipe.

Pipe 13 for introducing dry air, and spray nozzle 14 for supplying coating materials are provided on cover 15 which has port 16 for the granules (see FIG. 6). Also, ventholes 17 are provided in communication with hollow 18 in the bottom part of conical projection 6 and connects with an air inlet located on axle 5 leading to the outside of receptacle 3.

Ventholes 19 are located in dish 1 and/or barrel 2 and ventilation gap 20 is provided between dish 1 and barrel 2. These elements permit feeding of dry air (see FIG. 1). The gap between barrel 2 and dish 1 varies with the shape and size of granular materials, but it is usually less than 2 millimeters.

A hollow portion 21 may be provided under dish 1 having bottom plate 22, as shown in FIG. 1. Dry air is fed through air inlet 23 provided on bottom plate 22 passing through the hollow portion into receptacle 3. Axle 5 contacts bottom plate 22 at seal 24 to permit the introduction of dry air into receptacle 3.

In the process for coating granules by using the above-mentioned apparatus, the granules are charged into the receptacle and dish 1 is rotated by a driving motor. This causes circulation of the granules about the axis of rotation. The centrifugal force pushes the granules outwardly up from the center and they follow the curve of barrel 2 to the upper portion thereof and drop down on conical projection 6. The granules repeat this cycle of movement out to the circumference of dish 1 to the smoothly curved inner-surface of barrel 2, and are raised upwards along barrel 2 until they fall in pieces towards the center portion by gravity.

Such a circulating pattern of the granules is always maintained even if the speed of rotation of dish 1 is varied widely.

Coating materials are then applied to the circulating granules. After the coating materials are uniformly spread on the surface of the granules, dry air is blown into receptacle 3 and through the coated granules. The timing of feeding coating material and/or dry air is controlled in accordance with the characteristics of the granules and the coating materials. In this manner, the dry coated granules are produced in receptacle 3.

The following examples illustrate the production of coated granules by the new process and apparatus.

A coating apparatus, as shown in FIG. 1, having a cylindrical portion with a diameter of 1340 mm., was charged with about 95 kg. of lactose tablets, each 8 mm. in diameter and weighing 170 mg. After spraying sugar coating materials and dusting powder, the tablets were dried by air at 45°–50° C. introduced at 10 m.³/min. This spraying and drying process was repeated several times to give sugar coated tablets each having a weight of 300 mg.

The same procedure was repeated using a conventional coating pan with a maximal diameter of 1340 mm. The properties of both sugar coated tablets thus obtained are shown in the following table.

TABLE 1

|  | Sugar-coated tablet obtained by the apparatus of the invention shown in Fig. 1 | Sugar-coated tablet obtained by a conventional coating pan |
|---|---|---|
| Period for coating, hours | 15 | 21 |
| Water content,[1] percent | 1.80 | 2.00 |
| Compressible strength,[2] kg | 9.0 | 8.6 |
| Friability,[3] min | 40 | 15 |

[1] Water content is calculated from an average value of the loss in weight measured 3 times by crushing 20 tablets and drying about 1 g. of the resultant powder at 60° C. under a pressure less than 5 mm. Hg. for 5 hours.
[2] Compressible strength is an average of the values measured 20 times by an Erweka Hardness Tester. (This tester is described in a paper, written by David Brook and Keith Marshall, on page 481 in volume 57, number 3 of 1968 of the Journal of Pharmaceutical Science.)
[3] Friability is the period in which at least 2 tablets are damaged when 20 tablets are treated at 50 r.p.m. in a Friabilator with 55 cm. disk. (This testing method is described in a paper on page 114 of volume XLV, number 2 of February, 1959 of the Journal of American Pharmaceutical Society, Scientific Edition.)

EXAMPLE 2

A coating apparatus as shown in FIG. 2 was charged with about 50 kg. of vitamin tablets, each having a diameter of 7.0 mm. and weighing 140 mg. After spraying on the coating materials, the tablets were dried by air at 45°–50° C. introduced at 4.5 m.³/min. This spraying and drying process was repeated several times to produce sugar coated tablets having a weight of 260 mg./tablet.

The same procedure was repeated but using a conventional coating pan of comparable size instead of the coating apparatus of the present invention.

The results are shown in the following table.

TABLE 2

|  | Sugar-coated tablet obtained by the apparatus of the invention shown in Fig. 2 | Sugar-coated tablet obtained by a conventional coating pan |
|---|---|---|
| Period of coating, hours | 18 | 24 |
| Water content, percent | 1.85 | 2.05 |
| Compressible strength, kg | 8.0 | 6.5 |
| Friability, min | 38 | 16 |

The test methods are the same as those in Example 1.

EXAMPLE 3

Figure 3:
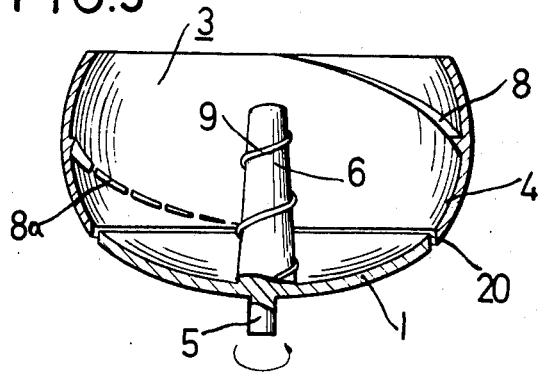
FIG. 3 is a sectional view similar to FIG. 1 of a third embodiment of the invention.

A coating apparatus as shown in FIG. 3 was charged with about 12 kg. of uncoated tablets, eac having a diameter of 7 mm. and weighing 175 mg. After spraying a cellulose acetate-phthalate enteric coating liquid on the tablets, they were dried with warm air as in the previous examples. This procedure was repeated to get enteric film coated tablets having a weight of 185 mg./tablet.

The same procedure was repeated but using a conventional coating pan of comparable size.

The results are shown in the following table.

TABLE 3

|  | Film-coated tablet obtained by the apparatus of the invention shown in Fig. 3 | Film coated tablet obtained by a conventional coating pan |
|---|---|---|
| Period for coating | 4 hours | 6 hours |
| Water content | 2.68 percent | 2.70 percent |
| Compressible strength | More than 15 kg | More than 15 kg. |
| Friability | No change after 30 min. | No change after 30 min. |

EXAMPLE 4

The sugar coating procedure for vitamin tablets was carried out as in Example 1 but using the coating apparatus shown in FIG. 3.

A comparably sized conventional coating pan was used with the otherwise identical method for a comparison.

The results are shown in the following table.

TABLE 4

|  | Sugar-coated tablet obtained by the apparatus of the invention shown in Fig. 3 | Sugar-coated tablet obtained by a conventional coating pan |
|---|---|---|
| Period for coating, hours | 16 | 21 |
| Water content, percent | 1.75 | 2.00 |
| Compressible strength, kg | 9.2 | 8.6 |
| Friability, min | 35 | 15 |

From the foregoing, it is to be understood that the invention is not to be limited to the exact deails described herein but is to be accorded with the full scope and protection of the appended claims.

What we claim is:

1. A process for coating granular material in an apparatus of the type having a rotatable dish which dish is mounted in a stationary barrel, said stationary barrel having a rising inner surface contiguous to the periphery of said dish and curved upwardly therefrom to present a steadily rising surface from said dish comprising the steps of charging said granular material into said barrel and onto said dish, rotating said dish to centrifugally move said granular material along said dish, said dish being rotated at a speed sufficient to move said granular material up the contiguous and rising inner surface of the barrel whereby said granular material is circulated from said dish, up said inner surface and back to said dish, feeding at least one coating material containing a liquid onto said granular material while the granular material is circulating, and feeding dry air into said granular material until at least some liquid in said coating material has evaporated.

2. A process according to claim 1 wherein said dish is continuously rotated about its center.

3. A process according to claim 1 wherein said air is fed into said granules through ventilating means in at least one of said dish and said barrel.

References Cited

UNITED STATES PATENTS

| | | | |
|---|---|---|---|
| 3,141,792 | 7/1964 | Lachman et al. | 117—100 X |
| 3,429,295 | 2/1969 | Shapiro | 117—100 X |
| 2,945,634 | 7/1960 | Beck | 117—100 X |
| 3,033,159 | 5/1962 | O'Brien | 117—100 X |
| 3,106,492 | 10/1963 | MacDonald et al. | 117—100 X |
| 3,256,111 | 6/1916 | Singiser | 117—100 X |
| 3,383,236 | 5/1968 | Brindamour | 117—100 X |
| 3,440,085 | 4/1969 | Baker et al. | 117—100 X |

WILLIAM D. MARTIN, Primary Examiner

M. R. P. PERRONE, JR., Assistant Examiner

U.S. Cl. X.R.

117—100 A, 100 M, 100 C, 100 S, 109; 118—500; 259—7, 8